United States Patent Office 3,597,356
Patented Aug. 3, 1971

3,597,356
SPECULAR ELECTROLYTIC IRON CONTAINING FLUORESCENT PARAMAGNETIC PIGMENTS FOR FLAW DETECTION
David Diperstein, Glenside, and David P. Mason, Dresher, Pa., assignors to Testing Systems, Inc., Glenside, Pa.
No Drawing. Continuation-in-part of application Ser. No. 770,422, Oct. 24, 1968, which is a continuation-in-part of application Ser. No. 484,436, Sept. 1, 1965. This application Jan. 7, 1970, Ser. No. 1,300
Int. Cl. H01f *1/28;* G01n *27/82;* C09k *1/02*
U.S. Cl. 252—62.52                          5 Claims

ABSTRACT OF THE DISCLOSURE

A fluorescent paramagnetic pigment consisting essentially of finely divided specular electrolytic iron powder coated with a fluorescent material consisting of a daylight fluorescent dyestuff in a resinous base, with the weight ratio of daylight fluorescent material to the electrolytic iron being between 1 to 1 and 1 to 100. A crack detector composition comprising a uniform dispersion of the aforesaid fluorescent paramagnetic pigment in a liquid vehicle. The method for forming the aforesaid fluorescent paramagnetic pigment which comprises uniformly mixing a solution of the fluorescent material and finely divided specular electrolytic iron powder, removing the solvent for the fluorescent material so as to deposit the fluorescent material on the electrolytic iron powder by evaporation with the weight ratio of the fluorescent material to the electrolytic iron being as aforesaid.

---

This application is a continuation-in-part of our copending patent application Ser. No. 770,422 filed Oct. 24, 1968, which was a continuation-in-part of our patent application Ser. No. 484,436 filed September 1, 1965, both now abandoned.

The present invention is directed to fluorescent paramagnetic pigments and to a method for making the same, and more particularly to fluorescent paramagnetic pigments for detecting cracks in articles.

The use of fluorescent paramagnetic pigments for crack detection is well known. Fluorescent paramagnetic pigments have been prepared by a variety of methods, such as those set forth in Pat. 2,864,771 issued Dec. 16, 1958 to Joseph L. Switzer et al.

These fluorescent paramagnetic pigments have suffered from handicaps.

Prior fluorescent paramagnetic pigments have had poor fluorescent properties. Moreover, normally it is necessary to disperse the fluorescent paramagnetic pigment in a hydrocarbon vehicle, such as kerosene, lubricating oil, naphtha, or the like. The use of these hydrocarbon vehicles constitutes a major disadvantage, as the storage and usage of liquid dispersions of these materials is accompanied by hazards due to the properties of the vehicle. Thus, the use of a hydrocarbon vehicle introduces a fire hazard due to the low flash point of these vehicles, and moreover introduces a health hazard due to the toxicity of these vehicles.

The use of water as a dispersion medium is to be preferred. However, until the advent of the present invention, the use of aqueous dispersions of fluorescent paramagnetic pigments had not proved to be entirely satisfactory in flaw detection methods. Thus, although attempts have heretofore been made to use water as a vehicle for dispersions of fluorescent paramagnetic pigments, satisfactory dispersions of the pigments could not be achieved. The pigments tended to coagulate and to settle.

A very serious problem existing in fluorescent magnetic inspection systems has been that of so-called "background scum" which rapidly increased as the flaw-revealing fluorescent magnetic particles were handled in use. These particles, if they were to be effective in indicating minute flaws, themselves had to be very fine and of such small mass, individually, as to be retained on the surface of the test piece by the very slight amount of flux diverted above the surface by the flaw. For this reason, i.e., to obtain small particle size, the preferred magnetic particles have heretofore been magnetic oxide, such as red magnetic iron oxide, which can conveniently be ground to average particle sizes as fine as a micron or less. To render such magnetic particles fluorescent, a preferred commercial procedure was to disperse the magnetic particles and fine, highly fluorescent pigments in a lacquer and, upon drying of the lacquer, to grind the mass to particles of the size desired. The desired particle so obtained comprised a magnetic portion, a fluorescent pigment portion, and lacquer adhering the said portions together. However, the grinding of this mass of iron oxide, fluorescent pigment, and lacquer also produced some particles of free oxide, free pigment, lacquered pigment containing no oxide, or lacquer and oxide containing no pigment. Although careful efforts should be and were made to separate the non-magnetic but fluorescent fractions from the grind, as well as the magnetic but non-fluorescent fractions, it was inevitable that some of each remained. Further whether the fluorescent magnetic particles were handled as a dry powder, or more commonly, as a dispersion in an aqueous or oily vehicle, the proportion of these fractions rapidly increased during use due to the breaking of the relatively soft and friable lacquer bond in the attrition of the particles against each other and in the handling equipment. These fluorescent non-magnetic fractions, along with some very slightly magnetic fluorescent particles tend to cling to unflawed surfaces, causing a light-emitting "background scum" which, even in a relatively small amount, greatly decreased the desired contrast ratio between the indications and the test field. Also, due to the configuration of the test piece, the flow of the fluorescent magnetic particles over the test piece sometimes caused the portion constituting "background scum" to collect in streaks, giving false indications as well as confusing true flaw indications. Further, it is suspected that the proportion of non-fluorescent magnetic particles in the mass of testing media may have occasionally masked or displaced fluorescent magnetic particles over a very fine flaw.

This invention has an object the provision of a novel fluorescent paramagnetic pigment.

This invention has an another object the provision of a novel fluorescent paramagnetic pigment which may be dispersed in an aqueous dispersion and the resultant dispersion used for the detection of flaws.

This invention has as a still further object the provision of a fluorescent paramagnetic pigment which suffers from a minimal amount of "background scum."

This invention has as still another object the provision of a method for making fluorescent paramagnetic pigments suitable for use in aqueous dispersions.

Other objects will appear hereinafter.

It has been discovered that fluorescent paramagnetic pigments capable of being used in aqueous dispersions can be produced if the fluorescent paramagnetic substrate comprises finely divided specular electrolytic iron. The term "specular electrolytic iron" as used herein is defined in the next paragraph.

It has been discovered that specular electrolytic iron is the uniquely suitable paramagnetic substrate for the formation of fluorescent paramagnetic pigments. Specular electrolytic iron is electrolptic iron of exceptionally high purity, which possesses a high degree of reflectivity, and which is present in particles which are largely devoid of jagged edges.

In an optimal specular electrolytic iron the purity should be such that the iron is present in about 98.90 weight percent or more. Typical impurities can be a total carbon of about 0.02 weight percent, a hydrogen loss determined by MPIF 2-48 of 0.59 weight percent, and with a total remaining impurities of about 0.49 weight percent. The physical properties of an optimal specular electrolytic iron suitable for use in the present invention include an apparent density of between about 2.18 to 2.28, and preferably about 2.23 grams per cc determined according to MPIF 4-45. A sieve analysis and weight percent pursuant to MPIF would be approximately 96 weight percent of the particles passing through a 325 mesh screen, and with the remaining 4 weight percent passing through a 250 mesh screen.

In its broader aspects, specular electrolytic iron can be used whose total iron concentration is as low as 96.0 weight percent, provided that the particles are highly reflective, and devoid of jagged edges. In the following table, there is set forth maximum allowable specifications and typical specifications for the lower grade specular electrolytic iron, which can be used in the subject invention:

|   | Specifications | Typical |
|---|---|---|
| Chemical properties, percent: | | |
| (1) Total iron | [1] 96.00 | 98.3 |
| (1) Acid ($H_2SO_4$) insolubles | [2] 1.25 | 0.04 |
| (1) Arsenic | [2] 0.0008 | [3] |
| Total carbon | | 0.005 |
| (3) Hydrogen loss | | 1.5 |
| (1) Lead | [2] 0.0025 | <0.0010 |
| (2) Litmus reaction | None | None |
| (1) Mercury | [2] 0.0005 | [3] |
| (2) Sulfide sulfur | None | None |
| All other | | 0.08 |
| Physical properties: | | |
| (4) Apparent density, gms./cc | 1.95–2.3 | 2.0 |
| (5) Sieve analysis, Tyler, percent: | | |
| +325 mesh | [2] 5.0 | 2.2 |
| −325 mesh | [1] 95.0 | 97.8 |
| (6) Fisher Number | 4.5–8.0 | 6.2 |

[1] Minimum. [2] Maximum. [3] Nil.

Test methods

National Academy of Sciences—National Research Council
   (1) Food Chemicals Codex, First Edition
National Formulary Standards
   (2) National Formulary—Tenth Edition
MPIF Standards
   (3) 2-64  (4) 4-45  (5) 5-62  (6) 32-60

The preferred pigment constitutes the daylight fluorescent compositions disclosed in D'Alelio et al. Pat. 3,116,256 issued Dec. 31, 1963, the disclosure of which is incorporated herein by reference. These daylight fluorescent compositions comprise a daylight fluorescent dyestuff in a thermoplastic resinous base. In particular, the daylight fluorescent compositions to be used in the fluorescent paramagnetic pigments of the present invention, which are described in detail in Pat. 3,116,256 comprise a daylight fluorescent dyestuff, such as Xylene Red B, Rhodamine 6GDN, Azosol Yellow 6GF, Brilliant sulfoflavine FFA, Rhodamine RX, and the like. The resinous base is formed by the co-condensation of an aryl sulfonamide aldehyde and benzoguanamine and aldehyde. The aryl sulfonamide is selected from the group consisting of p-toluene sulfonamide and o-toluene sulfonamide and mixtures thereof. The aldehyde is selected from the group consisting of formaldehyde and paraformaldehyde. The daylight fluorescent dyestuff is present in an amount sufficient to impart daylight fluorescence, and the benzoguanamine is present in an amount within the range of more than 50 but less than 60 mol percent of the aryl sulfonamide.

By way of example, a suitable daylight fluorescent yellow pigment is that disclosed in Example 6 of Pat. 3,116,256, namely a pigment consisting of 40.7 weight percent of toluene sulfonamideformaldehyde resin (Santolite MHP-Monsanto Chemical Co.), 30.5 weight percent benzoguanamine, 26.4 weight percent Formalin (37 weight percent aqueous formaldehyde solution), and 2.4 weight percent Brilliant Yellow 6G base.

This pigment is soluble in acetone, butyl Carbitol acetate, or in chlorinated hydrocarbon solvents, such as methylene chloride, chloroform, and the like.

We have discovered that the daylight fluorescent pigment may be uniformly deposited upon the specular electrolytic iron by dissolving the pigment in a solvent, such as methylene chloride, and uniformly blending the dissolved pigment with specular electrolytic iron powder of the type referred to above, and then evaporating off the solvent and depositing the fluorescent pigment upon the surface of the specular electrolytic iron particles. A wide variation in weight ratios can be used, depending upon the ultimate use to which the mixture is put. Thus, the pigment may be present in a weight ratio range to the specular electrolytic iron of from 1 part by weight of the pigment to 1 part by weight of the specular electrolytic iron up to 1 part by weight of the pigment per 100 parts by weight of the specular electrolytic iron. A good weight ratio for detecting cracks in which water is used as the dispersion medium is a weight ratio of 1 part of the pigment to 4 parts of the specular electrolytic iron.

If the paramagnetic pigments are to be used in an aqueous dispersion medium, then the aqueous solution should preferably contain a dispersing agent. While the nature of the dispersing agent is not critical, and a wide variety of suitable dispersing agents are commercially available, we have found that Tamol 731 is a particularly useful dispersing agent. This material is sold as a dispersing agent by Rohm & Haas Company, Philadelphia, Penna. 19105, and is the sodium salt of a carboxylated polyelectrolyte. Alternatively, we have used equal amounts of Tamol SN obtained from the same supplier. Tamol SN is the sodium salt of sulfonated naphthalene formaldehyde condensate. The properties of these dispersing agents are presented in the Technical Bulletins of Rohm & Haas Company.

We have found that the concentration of the dispersing agent can be varied over a wide range, such as equal to from ½ to 5 grams of Tamol 731 or Tamol SN per gallon of the total aqueous fluorescent paramagnetic pigment particles in the aqueous vehicle.

When an aqueous vehicle is used, it is preferable but not essential to also include in the mixture borax as a cleansing agent, or a like cleansing agent, and also a rust inhibitor. A wide variety of suitable water soluble rust preventatives are commercially available.

In aqueous media, the fluorescent paramagnetic pigment should be present in a concentration of between 2 to 40 grams per gallon of dispersion mixture. A good aqueous mixture includes 5 grams of paramagnetic pigment, 1 gram of Tamol SN or Tamol 731, 34 grams of borax and the commercially recommended quantity of any suitable rust inhibitor, uniformly dispersed in 1 gallon of mixture.

While aqueous mixtures are to be preferred, the subject invention is equally applicable to the use of hydrocarbon vehicles, such as odor-free kerosene. With such preparations, only the fluorescent paramagnetic pigment need be used, cleansing agent and/or rust inhibitor, and a dispersing agent are normally not necessary. Concentrations of from 2 to 40 grams of fluorescent paramagnetic pigment per gallon of dispersion mixture may be used when a hydrocarbon vehicle is used.

The fluorescent paramagnetic pigments of the present invention may be employed for the detection of cracks using standardized procedures. Thus, the fluorescent paramagnetic pigment uniformly suspended in a vehicle (aqueous or non-aqueous) is applied to the metal part that is to be tested. The metal part should have been cleaned and dried so that it is entirely free of oil and grease. The mixture of fluorescent paramagnetic pigment in vehicle can be applied by a spray, or the metal part can be dipped into the mixture.

The metal part is under the influence of a magnetic field during the crack detection process. The spray or dip is removed from the surface of the metal part so that the fluorescent paramagnetic pigment remains only in the cracks, and can be readily detected by the use of so-called black light.

The fluorescent paramagnetic pigments of the present invention glow with a pronounced fluorescence, and enable even the tiniest of cracks to be detected.

While we do not wish to be bound by any theory, it is our present belief that the reason why the fluorescent paramagnetic pigments of the subject invention are relatively free of background scum is due to the combination of both the relatively smooth surfaced specular electrolytic iron powder used in the subject invention, which minimizes the opportunity of scum breaking off, and the method of preparation used in the subject invention which avoids micropulverizing and milling. It is our belief that such micropulverizing and milling is a major cause of background scum.

Moreover, we have noted that the fluorescent paramagnetic pigments of the present invention exhibit a high degree of brightness. We attribute this, although we do not wish to be bound by our theory, to the high reflective nature resulting from the smooth surface of the specular electrolytic iron particles, and the absence of jagged edges on the specular electrolytic iron. Our theory is that the specular electrolytic iron functions as a mirror and serves to reflect back the light. The absence of jagged edges minimizes disintegration of the particles during preparation of the fluorescent paramagnetic pigment, and the usage thereof. This in turn markedly increases the efficacy of the fluorescent paramagnetic pigments of the present invention, and materially reduces the "background scum."

The fluorescent paramagnetic pigments of the present invention are relatively inexpensive to prepare, since the steps of micropulverizing and milling are relatively expensive, and involve the use of relatively expensive equipment.

As above-indicated, the fluorescent paramagnetic pigments of the present invention give very uniform suspensions in vehicles, such as water, and tend to settle more slowly. The applicants have made side-by-side comparisons of the fluorescent paramagnetic pigments of the present invention with identical materials prepared from carbonyl iron using the procedure of the aforesaid Kazenas Pat. 2,936,287, and the pigments of the present invention are markedly superior.

The present invention may be embodied in other specific forms without departing from the spirit or essential attributes thereof and, accordingly, reference should be made to the appended claims, rather than to the foregoing specification as indicating the scope of the invention.

We claim:

1. A fluorescent paramagnetic pigment for use in either aqueous or hydrocarbon crack detecting compositions consisting essentially of finely divided specular electrolytic iron powder; said finely divided specular electrolytic iron powder having a minimum iron content of 96 weight perment, an apparent density of 1.95 to 2.3 grams per cc., and a sieve analysis such that up to 5 weight percent of the powder is retained on and the remainder passes through a 325 mesh Tyler screen; and the surfaces of said finely divided specular electrolytic iron powder being coated with a daylight flourescent material consisting essentially of a daylight fluorescent dyestuff uniformly dissolved in a thermoplastic resinous base, with the weight ratio of said daylight fluorescent material to said iron powder being between 1:1 and 100:1.

2. A fluorescent paramagnetic pigment in accordance with claim 1 in which the finely divided specular electrolytic iron powder contains at least 98.9 weight percent iron, of apparent density of between about 2.18 to 2.28 grams per cc., and a sieve analysis of approximately 96 weight percent through a 325 mesh screen with the remaining 4 weight percent through a 250 mesh screen.

3. A fluorescent paramagnetic pigment in accordance with claim 1 in which the daylight fluorescent material consists essentially of a daylight fluorescent dyestuff in a resinous base formed by the co-condensation of an aryl sulfonamide aldehyde and benzoguanamine and aldehyde wherein the aryl sulfonamide is selected from the group consisting of p-toluene sulfonamide and o-toluene sulfonamide and mixtures thereof and wherein the aldehyde is selected from the group consisting of formaldehyde and paraformaldehyde, wherein the daylight fluorescent dyestuff is present in an amount sufficient to impart daylight fluorescence and the benzoguanamine is present in an amount within the range of more than 50 but less than 60 mol percent of the aryl sulfonamide.

4. A crack detector composition consisting essentially of a uniform dispersion of the fluorescent paramagnetic pigment of claim 3 in a liquid selected from the group consisting of water and hydrocarbon vehicles, with the concentration of the fluorescent paramagnetic pigment being between 2 grams and 40 grams per gallon of composition.

5. A crack detector composition consisting essentially of a uniform dispersion of the fluorescent paramagnetic pigment of claim 3 in water, and a sufficient amount of a dispersing agent to maintain a uniform dispersion of the fluorescent paramagnetic pigment in the water, with the concentration of the fluorescent paramagnetic pigment being between 2 grams and 40 grams per gallon of composition.

References Cited
UNITED STATES PATENTS

| | | | |
|---|---|---|---|
| 2,267,999 | 12/1941 | Switzer | 252—62.52X |
| 2,974,104 | 3/1961 | Paine et al. | 252—62.53 |
| 3,404,093 | 10/1961 | Borrows | 252—62.52 |

FOREIGN PATENTS

| | | | |
|---|---|---|---|
| 797,335 | 7/1958 | Great Britain | 252—62.52 |

TOBIAS E. LEVOW, Primary Examiner

J. COOPER, Assistant Examiner

U.S. Cl. X.R.

252—62.54, 62.55, 301.3R